United States Patent
Button et al.

(10) Patent No.: US 6,342,966 B1
(45) Date of Patent: *Jan. 29, 2002

(54) CROSSTALK SUPPRESSION IN A MULTIPATH OPTICAL AMPLIFIER

(75) Inventors: Leslie James Button, Corning; Paul Anthony Jakobson, Big Flats; Peter Gerard Wigley; Michael John Yadlowsky, both of Corning, all of NY (US)

(73) Assignee: Corning Incorporated, Corning, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 09/576,663

(22) Filed: May 23, 2000

Related U.S. Application Data

(63) Continuation of application No. 08/925,918, filed on Sep. 9, 1997, now Pat. No. 6,084,704.
(60) Provisional application No. 60/030,378, filed on Nov. 6, 1996.

(51) Int. Cl.[7] .................................................. H01S 3/00
(52) U.S. Cl. ................. 359/341.2; 359/143; 359/337.2; 372/6
(58) Field of Search ................. 359/134, 139, 359/143, 160, 337, 341, 341.2, 337.2; 385/24.37; 372/6

(56) References Cited

U.S. PATENT DOCUMENTS 5,812,306 A * 9/1998 Mizrahi ...................... 359/341
5,815,308 A * 9/1998 Kim et al. .................. 359/341

FOREIGN PATENT DOCUMENTS

| EP | 841764 | * | 5/1998 |
| WO | WO95/15625 | * | 6/1995 |

OTHER PUBLICATIONS

Bernard et al., IEEE Photonic Tech. Letters, vol. 9 No. 8, pp 911–913, Aug. 1992.*
Cheng et al., IEEE Photonics Tech. Letters, vol. 5, No. 3, pp 356–358, Mar. 1993.*
Yadlowski M; Optics and Photonics Series 1, vol. 16, pp 307–324.*

* cited by examiner

*Primary Examiner*—Nelson Moskowitz
(74) *Attorney, Agent, or Firm*—Svetlana Z. Short

(57) ABSTRACT

A multi-amplification path optical amplifier including a first amplification path for propagating and amplifying a first in-band optical communication signal, including a spectrally selective filter for substantially blocking the propagation and amplification of an out-of-band optical communication signal along the first amplification path, and a second amplification path for propagating and amplifying a second in-band optical communication signal, including a spectrally selective filter for substantially blocking the propagation and amplification of an out-of-band optical communication signal along the second amplification path, wherein the location. If the spectrally selective filters in each respective amplification path is selected so that a target noise figure performance and a target output power performance can be obtained from the device. The spectrally selective insertion losses suppress crosstalk or optical leakage that gives rise to multipath interference, return loss, and self oscillation.

5 Claims, 2 Drawing Sheets

CROSSTALK SUPPRESSION IN A MULTIPATH OPTICAL AMPLIFIER

CROSS-REFERENCED TO A RELATED APPLICATION

Reference is made commonly assigned patent application Ser. No. 08/925,918, filed on Sep. 9, 1997, now U.S. Pat. No. 6,084,704, in the name of Button et al. and entitled "CROSSTALK SUPPRESSION IN A MULTIPATH OPTICAL AMPLIFIER". Which claims priority to provisional application serial No. 60/030,378, filed on Nov. 6, 1996.

BACKGROUND

This invention relates to multi-wavelength optical signal amplification devices and optical telecommunications systems utilizing such devices, and in particular to a dual amplification path (multichannel) optical amplifier having selectively located spectral filtering for suppressing crosstalk induced multipath interference (MPI), return loss (RL), and self oscillation, and which also provides for a desired level of noise figure performance and output power performance (i.e., pump utilization efficiency) notwithstanding increased filter insertion loss.

The term "crosstalk" as used hereinafter will refer to an amplifier gain and reflection dependent phenomenon that is the genesis of multipath interference (MPI), return loss (RL), and self-oscillation, each of which are detrimental to good performance of a fiber optical communications system including an optical amplifier. The source of crosstalk induced MPI is illustrated in FIG. 1, which very generically shows a bi-directional optical amplifier including a west-to-east optical signal transmission/amplification path 1-2-3 (where 1 and 3 are a west and east reflection, respectively, and 2 is a gain from west-to-east) for wavelengths $\Delta\lambda_1$, for example, and an east-to-west optical signal transmission amplification path 3-4-1 (where 4 is a gain from east-to-west) for wavelengths $\Delta\lambda_2$. A $\Delta\lambda_1$ MPI loop is represented by nodes 1-2-3-4-1 (i.e., $\Delta\lambda_1$ input $G_1$-$R_E$-$G_2$-$R_W$). Interference between originally transmitted $\Delta\lambda_1$ signals and $\Delta\lambda_1$ signals traversing the MPI loop gives rise to MPI. Likewise, node path 3-4-1-2-3 represents a $\Delta\lambda_2$ MPI loop.

Return loss (RL) refers to $\Delta\lambda_1$ signals traversing nodal path 2-3-4 (i.e., $G_1$,-$R_E$-$G_2$), and/or $\Delta\lambda_2$ signals traversing path 4-1-2, and represents the effective return reflectivity of the amplifier as seen by the communication system.

Self oscillation in the amplifier (laser oscillation) will occur when a loop or cavity is set up in which the gain exceeds the losses. Therefore, e.g., if $G_1$+$R_W$+$G_2$+$R_E$>0, then lasing will likely occur. Although the following specification will describe the invention in terms of abidirectional (two counter-directional amplification paths) optical amplifier, the invention equally applies to a multichannel, unidirectional (two co-directional amplification paths) optical amplifier.

A bi-directional optical signal amplifying device may typically provide a signal amplification path in substantially one direction (e.g., east to west) for one or more in-band communication channels within a particular frequency band (e.g., the "red" band or hereinafter, $\Delta\lambda_1$), and a second signal amplifying path in a counter propagating direction (i.e., west to east) for one or more in-band communication channels in a different frequency band (e.g., "blue" band or hereinafter, $\Delta\lambda_2$). Optical amplifiers used in optical communication transmission systems typically incorporate an optical isolator in the amplification path for filtering unwanted reflections or to suppress the build up of spontaneous emission, the effects of which impair amplifier and system performance. Although it is well known that most "all optical" amplifiers, such as erbium doped fiber amplifiers (EDFA's) and semiconductor amplifiers, for example, will amplify an input signal regardless of the direction that the signal enters the device, the use of an isolator in the amplification path essentially restricts such a device to substantially unidirectional operation. Optical amplifiers that are functionally bi-directional, on the other hand, and particularly those that include a substantially uni-directional amplification path for each counter propagating signal band, respectively, require means for primary signal routing through the respective counter directional amplification paths. The means for routing the primary counter propagating signals may include, for example, optical circulators or wavelength selective directional filters at each input/output port of the bidirectional amplifier. Optical circulators are not preferred primary signal routing components for use at the input/output of a bi-directional optical amplifier because they are not wavelength selective devices and they are expensive.

Currently available wavelength selective directional filters, particularly single stage components, lack the capability to provide the desired degree of spectral band discrimination within a desired narrow spectral range. For instance, in an EDFA, the gain spectrum window is on the order of 30 nm (1530–1560 nm). As shown in FIG. 1, a typical interference filter can provide approximately 10 dB spectral band discrimination through attenuation from reflection. This occurs, however, over a finite spectral range accompanied by a spectral "dead zone" of about 3–10 nm adjacent the signal band, instead of ideally as a step function, as shown in FIG. 5.

The dead zone thus reduces the communication signal channel availability in an already limited spectral window. Moreover, the 10 dB attenuation typically is not sufficient to eliminate MPI, RL and self oscillation effects due to, for example, reflected and double reflected $\Delta\lambda_2$ light (from connectors or Rayleigh scattering) propagating in and being amplified by the primary amplification path for $\Delta\lambda_1$ light, and vice-versa. More specifically, we have found that the most critical need for wavelength selective isolation in a bidirectional optical amplifying device is to suppress crosstalk induced MPI, RL, and self oscillation. Even with the use of isolators in the unidirectional amplification paths, MPI, for example, can occur due to light (e.g., in-band $\Delta\lambda_1$) that propagates through the amplifier, gets reflected by some mechanism in an optical path of the system, and counter propagates through the amplifier along the primary amplification path for $\Delta\lambda_2$ light (i.e., as out-of-band $\Delta\lambda_1$, by going through the 10 dB wavelength selective routing filter via the nominally suppressed path for $\Delta\lambda_1$, hitting another system reflection on the other side of the amplifier, and finally propagating again in the original intended direction of $\Delta\lambda_1$, (as in-band $\Delta\lambda_1$), to be re-amplified. One proposed solution to this problem is to increase the spectral isolation at the amplifier input/output routing locations to the primary, substantially unidirectional amplification paths for the respective in-band signals by, for example, using multi-stage filters at the input/output ports of the amplifier. This, however, also introduces increased insertion loss into the device which is not preferable as it is well known to those skilled in the art that increasing the insertion loss at the input end of an optical amplifier results in an overall increase in noise figure (due to signal spontaneous beat noise) of the device, while increasing the insertion loss at the output end of the amplifier results in decreased output power for a given pump power.

The inventors have therefore recognized a need for providing means for efficiently routing the respective communication signal bands into and out of the amplifier and, moreover, for suppressing unwanted (out-of-band) wavelength propagation through the amplifier that, if unsuppressed, results in crosstalk induced MPI, RL, and self oscillation, while not adversely impacting the noise figure and output power performance of the amplifier due to the increased insertion loss resulting from the spectral filtering.

SUMMARY OF THE INVENTION

Additional features and advantages of the invention will be set forth in the description that follows, and in part will be apparent from the description, or may be learned by practice of the invention. The objectives and other advantages of the invention will be realized and attained by the apparatus and method particularly pointed out in the written description and claims hereof as well as the appended drawings.

To achieve these and other advantages and in accordance with the purpose of the invention, as embodied and broadly described, an embodiment of the invention describes an optical signal amplification device having a substantially unidirectional first primary amplification path for amplifying an in-band wavelength band, $\Delta\lambda_1$, and a second substantially unidirectional primary amplification path for amplifying a different in-band wavelength band, $\Delta\lambda_2$, wherein at least one of the first and second amplification paths includes a wavelength selective insertion loss for substantially blocking the propagation of out-of-band signals in the amplification path, further wherein the location of the wavelength selective insertion loss in the amplification path is selected to provide either a target noise figure performance or output power performance from the device.

In an aspect of this embodiment, the wavelength selective insertion loss is a dielectric optical interference filter. In alternative aspects of this embodiment, the wavelength selective insertion loss may be obtained from, for example, a fiber distributed Bragg reflector, a long period grating coupler filter, and a wavelength dependent fiber coupler device such as a twisted evanescent or multiclad type WDM device.

In an aspect of the embodiment, the amplification path includes a rare earth doped optical fiber waveguide, such as an erbium doped fiber (EDF), for example. The invention, however, is not limited to fiber gain media, but may include a planar gain medium; and said gain media may include any of a variety of host glass compositions including silica, ZBLA(X), and oxyhalide (e.g., oxyfluoride) or glass ceramic compositions having appropriate lasing dopants incorporated therein.

In another embodiment, the invention describes a bidirectional optical signal amplification device that includes an input/output port for an optical signal band $\Delta\lambda_1$ and for an optical signal band $\Delta\lambda_2$, respectively, and another input/output port for an optical signal band $\Delta\lambda_2$ and for an optical signal band $\Delta\lambda_1$, respectively; a substantially unidirectional first primary amplification path for in-band $\Delta\lambda_1$ including a waveguiding gain medium and a first wavelength selective insertion loss located along said gain medium for substantially blocking propagation of out-of-band $\Delta\lambda_2$ along said first amplification path while substantially allowing propagation of in-band $\Delta\lambda_1$ along said amplification path; a substantially unidirectional second primary amplification path for in-band $\Delta\lambda_2$ including a waveguiding gain medium and a wavelength selective insertion loss located along said gain medium for substantially blocking the propagation of out-of-band $\Delta\lambda_1$, along said second amplifying path while substantially allowing the propagation of in-band $\Delta\lambda_2$ along said amplification path, first communication signals routing means coupled to the $\Delta\lambda_1$-input/$\Delta\lambda_2$-output port and further coupled to said first amplification path for substantially directing said $\Delta\lambda_1$ communication signals input to said port to said first amplification path; and second communication signals routing means coupled to said $\Delta\lambda_2$-input/$\Delta\lambda_1$-output port and further coupled to said second amplification path for substantially directing said $\Delta\lambda_2$ communication signals input to said port to said second amplification path. In an aspect of this embodiment, both the directional routing means and the wavelength selective insertion loss components can include, for example, a fiber distributed Bragg reflector, a long period grating coupler filter, and a wavelength dependent fiber coupler device such as a twisted evanescerf or multiclad type WDM device.

In another embodiment the invention describes an optical signal transmission system including a transmitter and a receiver and an optical amplifier having at least a first and a second substantially uni-directional primary amplification path for different in-band wavelength bands, $\Delta\lambda_1$ and $\Delta\lambda_2$, respectively, wherein each said amplification path includes a waveguiding gain medium and a wavelength selective insertion loss located along said respective gain media for substantially preventing the propagation of an out-of-band optical communications signal along said respective amplification path, further wherein said wavelength selective insertion losses are located in their respective amplification paths to provide either a target noise figure performance or output power performance from the device.

Another embodiment of the invention describes a method for suppressing crosstalk induced MR, RL, and self oscillation in an optical amplifying device while maintaining a desired or target level of noise figure performance and output power performance of the device, including the steps of routing a communication signal substantially including an in-band wavelength band $\Delta\lambda_1$, to a first substantially unidirectional gain path; providing a wavelength selective insertion loss in said gain path for substantially blocking the propagation of an out-of-band communication signals substantially including a wavelength band $\Delta\lambda_2$ while substantially allowing the propagation of in-band $\Delta\lambda_1$; routing a communication signal substantially including the in-band wavelength band $\Delta\lambda_2$ to a second substantially unidirectional gain path; providing a wavelength selective insertion loss in said second gain path for substantially blocking the propagation of out-of-band $\Delta\lambda_1$ while substantially allowing the propagation of $\Delta\lambda_2$, wherein said insertion losses are located in said respective gain paths to provide a pre-insertion loss gain and a post-insertion loss gain that provide either a desired or target noise figure performance and output power performance from the device.

It is to be understood that both the foregoing general description and the following detailed description are exemplary and are intended to provide further explanation of the invention as claimed. The accompanying drawings are included to provide a further understanding of the invention and are incorporated in and constitute a part of this specification, illustrate embodiments of the invention and together with the description serve to explain the principles of the invention.

Accordingly, the invention is directed to an apparatus and a method providing such features.

DETAILED DESCRIPTION OF A PREFERRED EMBODIMENT OF THE INVENTION

Figure 1:
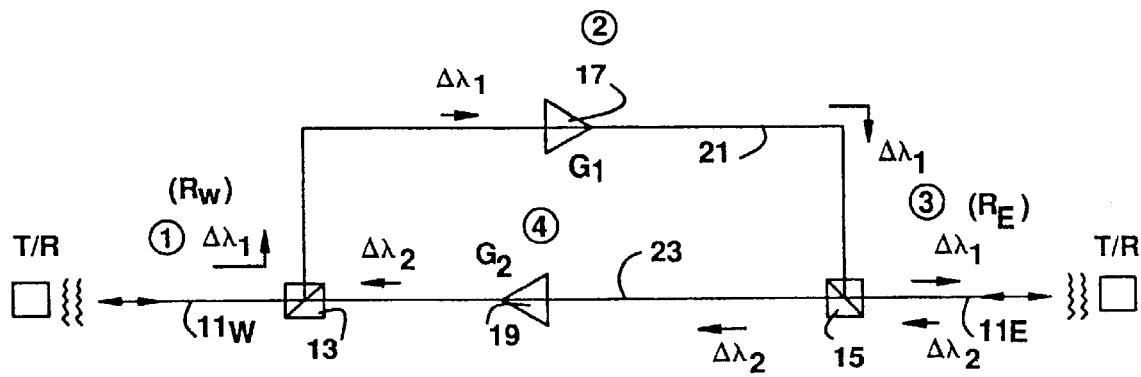
FIG. 1 is a schematic representation of a generic bidirectional optical signal amplification device having counter-directional amplification paths for respective in-band communication signal wavelength bands $\Delta\lambda_1$ and $\Delta\lambda_2$.
Figure 2:
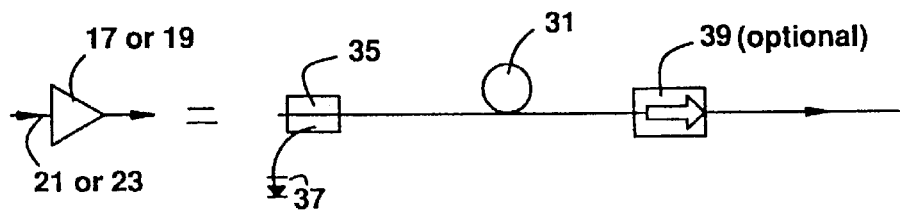
FIG. 2 is a more detailed view of one of the amplification paths of the device of FIG. 1.

Reference will now be made in detail to the present preferred embodiments of the invention, examples of which are illustrated in the accompanying drawings. FIG. 1 shows a form of a generic bi-directional optical signal amplification device 10 for guiding and amplifying optical signals in a first in-band wavelength band $\Delta\lambda_1$, in a west to east direction and for simultaneously propagating and amplifying optical signals in a second in-band wavelength band $\Delta\lambda_2$, in an east to west direction. The device 10 comprises a first substantially unidirectional primary amplification path 21 for in-band wavelength band $\Delta\lambda_1$, and a counter-directional, substantially unidirectional second primary amplification path 23 for in-band wavelength band $\Delta\lambda_2$, for amplifying and propagating respective optical signal wavelength bands $\Delta\lambda_1$, and $\Delta\lambda_2$, simultaneously, in opposite directions as shown. Amplifying paths 21, 23 are coupled to a transmission fiber $11_{west}$ by a first optical signal routing means 13, and to the transmission fiber $11_{east}$ by second optical signal routing means 15. In a preferred embodiment of the invention, the routing means 13, 15 are wavelength selective directional filters such as dielectric interference filters, for example. Optical circulators, used alone or in combination with a grating, for example, are alternative optical signal routing components, as are fiber distributed Bragg reflectors, long period grating coupler filters, and wavelength dependent fiber coupler devices such as twisted evanescent or multiclad type WDM devices. As shown in FIG. 2, each primary amplification path 21, 23 includes a respective waveguiding optical signal gain medium 17, 19, which preferably comprises an erbium doped fiber 31 and a pumping source 37 coupled thereto by a fiber optic coupler 35 or equivalent device known to those skilled in the art for coupling pump power into an active fiber. An optical isolator 39 is optionally located along the active fiber waveguide 31 to block backward traveling light from entering the active fiber; i.e., to render the amplification path substantially unidirectional. The invention, however, is not limited to gain media comprising erbium doped fibers, but may alternatively comprise other rare earth doped fiber waveguides, planar amplifying waveguides that are well known in the art, or other fiber or planar waveguide compositions including oxyhalide (e.g., oxyfluoride) glass ceramics, ZBLA(X), and others known in the art.

Figure 3A:
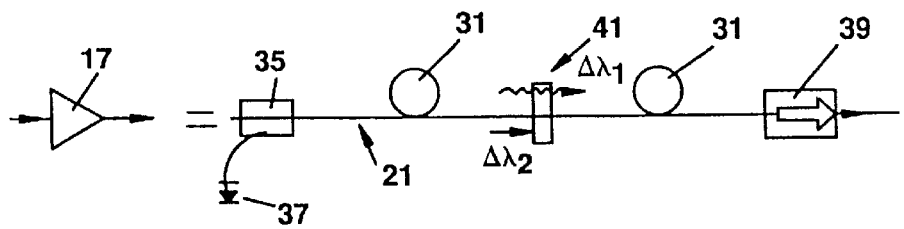
FIGS. 3A and 3B are respective counter-directional, uni-directional amplifying paths of a bi-directional signal amplification device according to an embodiment of the invention, including a wavelength selective insertion loss located along the amplification path.
Figure 3B:
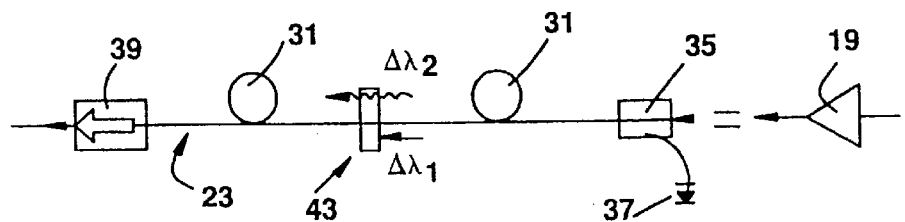

Referring again to FIG. 1, optical communications signals substantially comprising in-band $\Delta\lambda_1$ approach the device 10 from the west along transmission fiber $11_W$ where they are input to the device via first signal routing filter 13. Filter 13 is designed to efficiently route a maximum amount of in-band $\Delta\lambda_1$, input from the west to amplification path 21 and to allow a maximum amount of in-band $\Delta\lambda_2$ input from the east along path 23 to get to transmission fiber $11_W$. Likewise, optical communications signals substantially comprising in-band $\Delta\lambda_2$ approach the device 10 from the east along transmission fiber $11_E$ where they are input to the device via second signal routing filter 15. Filter 15 is designed to efficiently route a maximum amount of in-band $\Delta\lambda_2$ from transmission fiber $11_E$ to path 23 and a maximum amount of in-band $\Delta\lambda_1$ coming from amplification path 21 to get to transmission fiber $11_E$. Due to conventional filter technology limitations, filters 13, 15 will at best have a signal routing efficiency of about 90%; i.e., if filter 13 is designed to direct a ,13 maximum amount of in-band $\Delta\lambda_1$ signals to path 21 for propagation and amplification, it will be realized that filter 13 imparts about 10 dB insertion loss to the incoming signals, therefore about 10% of the input light is not directionally routed as intended but instead is transmitted to path 23 where it will typically be extinguished by an isolator (not shown). The in-band $\Delta\lambda_1$, light that is directed by routing filter 13 to path 21, and ultimately to east transmission fiber $11_E$ via routing filter 15, will inevitably be reflected, in part, back to routing filter 15 due to system reflections including, but not limited to, splice misalignment, connectors and Rayleigh scattering. Although in a preferred embodiment of the invention filters 13, 15 are wavelength selective, a small portion of the reflected $\Delta\lambda_1$ light along fiber $11_E$ will be passed by filter 15 to amplifying path 23 (as out-of-band $\Delta\lambda_1$ light for this amplification path), whereupon it will be amplified by gain unit 19 and directed via filter 13 in the west direction along transmission fiber $11_W$. This small amount of out of-band $\Delta\lambda_1$, light is not blocked by filter 15 because of the non-ideal discrimination 15 capability of the filter, a consequence of the small but finite (typically 10%) transmittance of the filter (for predominately reflected light). Additionally, due to the same filter limitations, light in the spectral dead band adjacent or in between, but not within, bands $\Delta\lambda_1$ and $\Delta\lambda_2$, can be routed along either amplification path, making the amplifier susceptible to self oscillation, for example, whereby any aggregate path gain exceeds the aggregate path loss resulting in the potential occurrence of laser action. A portion of the amplified out-of-band $\Delta\lambda_1$ light from path 23 traveling along fiber $11_W$ will again inevitably be reflected by one or more reflection points along transmission fiber $11_W$ whereupon a maximum amount of this reflected light will be reintroduced into primary amplifying path 21 (as in-band $\Delta\lambda_1$ light) via routing filter 14 13. This light will be amplified by amplifying unit 17 and input into transmission fiber $11_E$ in the east direction via filter 15 as described above. This double reflected $\Delta\lambda_1$, light will give rise to MPI with the originally transmitted $\Delta\lambda_1$, light, likely to cause a degradation in system performance. It will be appreciated that the exact same phenomenon will occur with respect to $\Delta\lambda_2$ light originally input to the device from the east. While it is appreciated that multiple, additional stages of insertion loss could be provided at the device input/output locations 13, 15 to sufficiently suppress crosstalk induced effects, it is also well known that increasing insertion loss before, or at an early partition of, signal gain will increase the noise figure of the system, while increasing insertion loss after, or at a later partition of, signal gain will decrease output power for a given pump input. Therefore, while routing filters 13, 15 are intended to most efficiently route the communication signals to their appropriate propagation/amplification paths, wavelength selective filter means 41, 43 in respective amplifying paths 21, 23, are provided to respectively block out-of-band $\Delta\lambda_2$ light from propagating along path 21 and out-of-band $\Delta\lambda_1$, light from propagating along path 23, as shown in FIGS. 3a and 3b. In a preferred embodiment of the invention, wavelength selective filter means 41, 43 are dielectric interference filters similar to filters 13, 15. Those skilled in the art, however, will understand that any appropriate spectral filtering components or techniques will work as long as the maximum amount of in-band signals are allowed to propagate along their intended path and a maximum amount of out-of-band signals are prevented from propagating along the path intended for the in-band signals. Examples of such components include a fiber distributed Bragg reflector, a long period grating coupler filter, and a wavelength dependent fiber coupler device such as a twisted evanescent or multiclad type WDM device.

Figure 4:
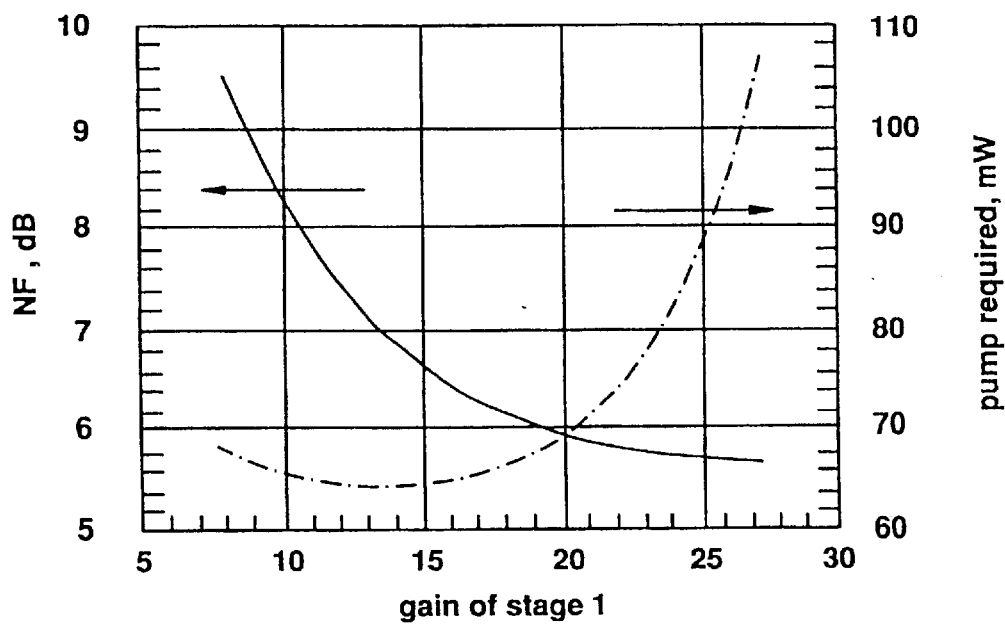
FIG. 4 is a graphical representation of the pump power (required to maintain a given output power) and noise figure (opposing y-axes) as a function of gain partitioning due to insertion loss location (x-axis) in an amplification path of an exemplary optical signal amplification device according to an embodiment of the invention.
Figure 5:
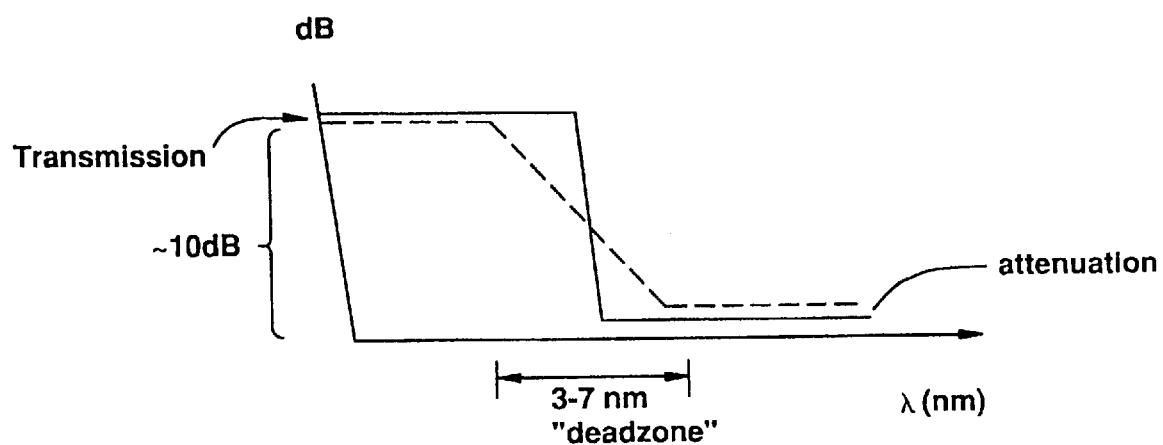
FIG. 5 shows ideal (solid line) and practical (dashed line) transmission/attenuation curves for a conventional directional routing filter as a function of wavelength.

In addition to the spectral filtering characteristics of filters 41, 43, per se, the location of these filters in their respective gain paths is important due to the insertion losses associated therewith and the well known effects of insertion loss location on noise figure and output power performance as a function of gain partitioning. This can be seen with reference to FIG. 4 which shows the pump power (required to maintain a fixed output power) and noise figure (accounting for signal spontaneous beat noise) as a function of how the length (and therefore, gain) of the erbium doped fiber (EDF) of an exemplary EDFA according to an embodiment of the invention is partitioned between two sections or stages of the EDF. In this embodiment, a two stage EDFA included an Input insertion loss of 2.2 dB, and was pumped at 980 nm using a pump feed-forward design. The dashed line shows the pump power required to achieve a 70% inversion level in the EDFA with approximately 29 dB of gain provided by the EDF. The solid line shows the noise figure of the device under the same conditions. FIG. 4 clearly demonstrates the trade off between noise figure and pump utilization efficiency as the insertion loss location partitions the gain between the two stages of EDF. Moreover, the figure points out that there is a limited range of locations in the gain path for the insertion loss where its impact on both noise figure performance and output power performance will be acceptable, and which will allow a desired or target noise figure performance and output power performance to be realized from the device. Typically, one will have an output power requirement to meet within a desired noise figure range, or vice versa, and these 16 design parameters will indicate to one skilled in the art where best to locate the insertion loss due to the spectral filtering provided by filters 41, 42; i.e., how to partition the pre-insertion loss gain and the post-insertion loss gain.

Example 1, below, illustrates an exemplary embodiment of the invention relating to suppression of crosstalk induced MPI.

EXAMPLE I

Given the following parameter values:

P (critical crosstalk gain limit-, e., magnitude of the secondary pulse with respect to the primary pulse)=(−)43 dB;

$G_{\Delta\lambda 1}$ (i.e., gain for in-band $\Delta\lambda_1$, signals along primary amplification path)=27 dB;

$G_{\Delta\lambda 1}$ (i.e., gain for in-band $\Delta\lambda_2$ signals along primary amplification path)=27 dB1

$R_{worst\ case}$ (i.e., worst case reflection requirement in a given direction)=(−)24 dB; and $G_{out\text{-}of\text{-}band\ \Delta\lambda 1}$ (i.e., gain for out-of-band signals along an amplification path)=27 dB, then:

$$G_{\Delta\lambda 2} + R_{east} + G_{out\text{-}of\text{-}band\ \Delta\lambda 1} + R_{west} < P$$

to suppress MPI. Substituting the given values reveals that an additional 50 dB loss is required for the out-of-band light to meet the stated MPI requirements. Taking into account that routing filters 15, 13 will each provide up to about 10 dB attenuation for input optical signals, an additional 30 dB insertion loss for the out-of-band signals is still required. Therefore, one or more stages of insertion loss, via filter 43, for example, each blocking up to about 90% of reflected out-of-band $\Delta\lambda_1$ light in path 23, are positioned along the erbium doped fiber 31 in the second amplifying path 23 at a location that enables the device to deliver either the target noise figure performance or output power performance, while also blocking the out-of-band $\Delta\lambda_1$ sufficiently to meet the given NIPI threshold requirements. Similar calculations are made for the out-of-band $\Delta\lambda_2$ signals and the location of filter(s) 41 in path 21. Moreover, similar calculations can be made by one skilled in the art to determine the necessary insertion loss to sufficiently eliminate crosstalk induced return loss and self-oscillation effects. With respect to return loss (RL), if $RL_{LIMIT}=X$, for example, then $RL_{EAST}=G+R_W+G<X$, and $RL_{WEST}=G+R_E+G<X$. A communications systems design will typically specify the value of $RL_{LIMIT}$.

It will be apparent to those skilled in the art that various modifications and variations can be made in the -apparatus and method of the present invention without departing from the spirit or scope of the invention. Thus, it is intended that the present invention cover the modifications and variations of this invention provided they come within the scope of the appended claims and their equivalents.

What is claimed is:

1. A bi-directional optical signal amplification device, comprising:
   (i) an input/output port for an optical communications signal band $\Delta\lambda_1$, and for an optical communications signal band $\Delta\lambda_2$, respectively;
   (ii) an input/output port for an optical communications signal band $\Delta\lambda_2$ and for an optical communications signal band $\Delta\lambda_1$, respectively;
   (iii) a substantially unidirectional first amplification path propagating and amplifying $\Delta\lambda_1$ as an in-band communications signal, including:
      (a) a first waveguiding gain medium dedicated only to said first amplification path and
      (b) a first wavelength selective insertion loss having a selected location along said gain medium to substantially propagation of an out-of-band communications signal $\Delta\lambda_2$ along said first amplification path while substantially allowing propagation of in-band $\Delta\lambda_1$ along said amplification path;
   (iv) a substantially unidirectional second amplification path propagating and amplifying $\Delta\lambda_2$ as an in-band communications signal, including:
      (a) a second waveguiding gain medium, said second gain medium being dedicated only to said second amplification path and
      (b) a second wavelength selective insertion loss having a selected location along said gain medium to substantially block propagation of an out-of-band communications signal $\Delta\lambda_1$ along said second amplifying path while substantially allowing the propagation of in-band $\Delta\lambda_2$ along said amplification path;

(v) first communication signals routing means substantially directing input of said in-band $\Delta\lambda_1$ communication signals to said first amplification path and amplified output said in-band $\Delta\lambda_2$ communication signals to a transmission waveguide; and (vi) second communication signals routing means substantially directing input said in-band $\Delta\lambda_2$ communication signals to said second amplification path and amplified output said in-band $\Delta\lambda_1$ communication signals to a transmission waveguide, (vii) wherein the location of the first wavelength selective insertion loss and the second wavelength selective insertion loss are respectively selected to provide a pre-insertion loss gain and a post-insertion loss gain for obtaining at least one of a target noise figure performance and a target output power performance from the device.

2. A method of improving the performance of a fiber optical telecommunication transmission system including an optical signal amplifying device having a substantially unidirectional first gain path for an in-band signal wavelength band $\Delta\lambda_1$, said first gain path including a gain medium dedicated only to said first gain path; and a substantially unidirectional second gain path for an in-band signal wavelength band $\Delta\lambda_1$, different than $\Delta\lambda_1$, said second gain path including a second gain medium dedicated only to said second gain path, said method comprising the steps of:

(i) routing a band of input $\Delta\lambda_1$ optical signals to said first gain path for amplification and propagation as in-band $\Delta\lambda_1$ signals;

(ii) routing a band of input $\Delta\lambda_2$ optical signals to said second gain path for amplification and propagation as in-band $\Delta\lambda_2$ signals; and (iii) locating a wavelength selective filtering means having an insertion loss in at least one of the first gain path and the second gain path for blocking an out-of-band signal from propagating along said first gain path and being amplified thereby, wherein a location of said insertion loss is so selected to provide a pre-insertion loss gain and a post-insertion loss gain in the respective amplification path for obtaining at least one of a target noise figure performance and a target output power performance from the device.

3. The method of claim 2, wherein routing the input in-band $\Delta\lambda_1$ and the input in-band $\Delta\lambda_2$ signals comprises directing a maximum amount of said signals to their respective gain paths.

4. The method of claim 2, wherein said wavelength selective filtering means block a maximum amount of out-of-band signals in each respective in-band amplification path.

5. A bi-directional optical signal amplification device, comprising:

(i) a first unidirectional amplification path having an input and an output end and including a length of active fiber waveguide dedicated only to said first amplification path, for propagating and amplifying an in band communications signals wavelength band, $\Delta\lambda_1$, and a first wavelength selective filter located along the length of said active fiber for substantially blocking the propagation and amplification of an out-of-band communications signals wavelength band, $\Delta\lambda_2$ along the first amplifying path;

(ii) a second unidirectional amplification path having an input and an output end and including:

(a) a length of active fiber waveguide dedicated only to said second unidirectional amplification path and substantially for propagating and amplifying an in band communications signals wavelength band, $\Delta\lambda_2$, and (b) a second wavelength selective filter located along the length of said active fiber for substantially blocking the propagation and amplification of an out-of-band communications signals wavelength band, $\Delta\lambda_1$ along the second amplifying path;

(iii) a first optical signal directional routing component coupled to a transmission fiber and to one of an input and an output end of the first amplification path and, respectively, to one of an output and an input end of said second amplification path, for substantially routing the in-band optical signal to one of the first and the second amplification paths; and (iv) a second optical signal directional routing component coupled to the transmission fiber and to one of an input and an output end of the second amplification path and, respectively, to one of an output and an input end of said first amplification path, for substantially routing another in-band optical signal to one of the second and the first amplification paths, respectively, (v) wherein the respective locations of the first wavelength selective filter and the second wavelength selective filter are selected to partition the gain of the active fiber to provide at least one of a target noise figure performance and a target output power performance from the device given a respective output power performance and noise figure performance.

* * * * *